(12) United States Patent
Yolitz et al.

(10) Patent No.: US 9,863,512 B2
(45) Date of Patent: Jan. 9, 2018

(54) CONTINUOUSLY VARIABLE TRANSMISSION BELT GUIDE

(71) Applicant: Deere & Company, Moline, IL (US)

(72) Inventors: Nathan Yolitz, Horicon, WI (US); Stephan R. Hayden, Sun Prairie, WI (US)

(73) Assignee: Deere & Company, Moline, IL (US)

( * ) Notice: Subject to any disclaimer, the term of this patent is extended or adjusted under 35 U.S.C. 154(b) by 168 days.

(21) Appl. No.: 14/824,582

(22) Filed: Aug. 12, 2015

(65) Prior Publication Data

US 2017/0045122 A1 Feb. 16, 2017

(51) Int. Cl.
*F16H 7/20* (2006.01)
*F16H 7/12* (2006.01)

(52) U.S. Cl.
CPC ............. *F16H 7/20* (2013.01); *F16H 7/12* (2013.01)

(58) Field of Classification Search
CPC ..... F16H 9/18; F16H 9/20; F16H 7/12; F16H 7/20
See application file for complete search history.

(56) References Cited

U.S. PATENT DOCUMENTS

| 120,724 | A | 12/1916 | Turner | |
|---|---|---|---|---|
| 2002/0183149 | A1* | 12/2002 | Temma | F16H 9/20 474/133 |
| 2005/0148415 | A1* | 7/2005 | Hartley | F16H 9/18 474/8 |
| 2007/0033957 | A1* | 2/2007 | Taras | F16H 9/20 62/183 |
| 2008/0214345 | A1* | 9/2008 | Khan | F16G 13/06 474/231 |
| 2014/0033996 | A1 | 2/2014 | Sajdowitz | |
| 2014/0235390 | A1 | 8/2014 | Urbanek | |

FOREIGN PATENT DOCUMENTS

| EP | 2282081 A1 | 2/2011 |
|---|---|---|
| JP | 2006029486 A | 2/2006 |

OTHER PUBLICATIONS

British Search Report in foreign counterpart application GB1612660.9 dated Jan. 12, 2017 (4 pages).
British Search Report in foreign counterpart application GB1612664.1 dated Jan. 13, 2017 (4 pages).

* cited by examiner

*Primary Examiner* — William E Dondero
*Assistant Examiner* — Robert T Reese

(57) ABSTRACT

A continuously variable transmission belt guide is mounted next to a driven clutch assembly and in close proximity with the CVT belt at the CVT's lowest drive ratio. The CVT belt connects between a pair of moveable sheaves of the drive and driven clutch assemblies to provide a variable CVT drive ratio between a lowest drive ratio and a highest drive ratio. When contacting the CVT belt, the CVT belt guide prevents a ripple or wave from appearing in the un-tensioned side of the belt, prevents the CVT belt from losing contact with the driven clutch, and prevents undesirable vehicle performance at the lowest drive ratio.

7 Claims, 2 Drawing Sheets

CONTINUOUSLY VARIABLE TRANSMISSION BELT GUIDE

FIELD OF THE INVENTION

This invention relates to continuously variable transmissions for recreational or off road utility vehicles, and specifically to engagement of V-belts used in continuously variable transmissions.

BACKGROUND OF THE INVENTION

Continuously variable transmissions (CVTs) used in recreational or off road utility vehicles use rubber belts to transmit torque between a drive clutch, or primary clutch, and a driven clutch, or secondary clutch. CVT belts are typically V-belts that are expected to remain in contact with the V-belt pulleys of the drive and driven clutches. Some CVTs have "loose" V-belts that are not pre-tensioned between the two clutches while in a static state. Under certain conditions, "loose" V-belts may lose contact with the driven clutch. More specifically, when a CVT belt is used under high load conditions at the CVT's lowest drive ratio, including initial starts or hill climbing, for example, the drive clutch may clamp onto the belt and tension only one side of the belt between the drive and driven clutches. With high tension on only one side of the CVT belt, the belt may slip on the driven clutch. When the slipping stops and the CVT belt engages the drive clutch, a ripple or wave may appear in the un-tensioned side of the belt. Slack in the un-tensioned side of the belt may increase or amplify the ripple or wave so much that the belt may lose contact momentarily with the driven clutch. Even brief loss of engagement or contact of the belt with the driven clutch allows the transmission and driveline to release stored torsional stress and rotate opposite of the drive clutch. This may result in torque spikes when the primary clutch re-engages the belt, and the torque spikes transfer through the transmission and cause undesirable vehicle performance at the lowest drive ratio, such as shuddering or jerking. There is a need for a CVT with a "loose" belt that maintains contact with a driven clutch at low drive ratios and improves vehicle performance during initial starts, hill climbs, and other high load conditions.

SUMMARY OF THE INVENTION

A continuously variable transmission belt guide is positioned within a continuously variable transmission housing enclosing a drive clutch assembly, a driven clutch assembly, and a V-belt between the drive clutch assembly and driven clutch assembly. The belt guide includes a rotatable bearing that is in close proximity to the V-belt so that it may contact the V-belt at a maximum circumference of the driven clutch assembly. The belt guide assures the "loose" V-belt maintains contact with the driven clutch at low drive ratios to improve vehicle performance during initial starts, hill climbs, and other high load conditions.

DESCRIPTION OF THE PREFERRED EMBODIMENT

Figure 1:
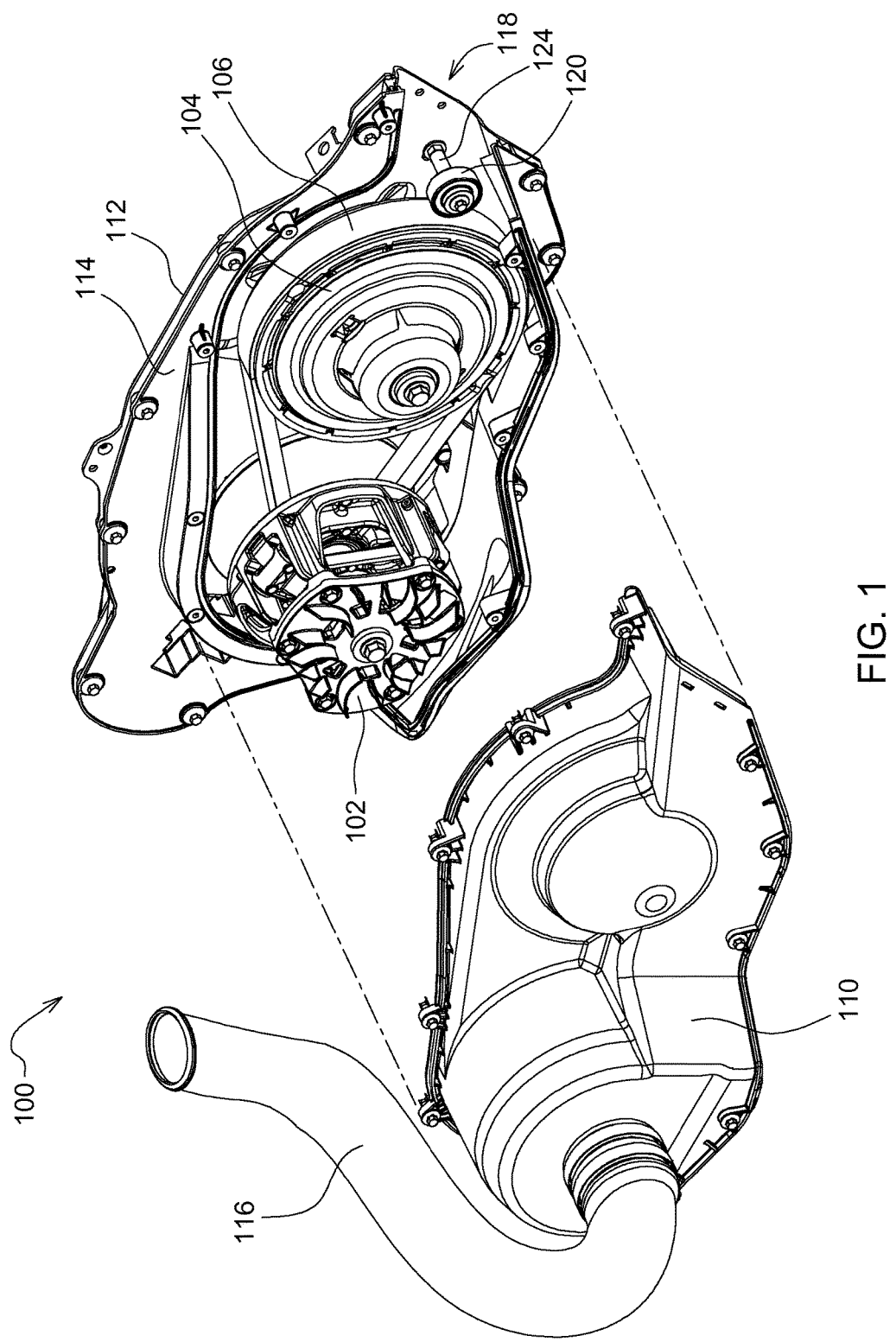
FIG. 1 is a partially exploded perspective view of a continuously variable transmission with a belt guide according to a first embodiment of the invention.
Figure 2:
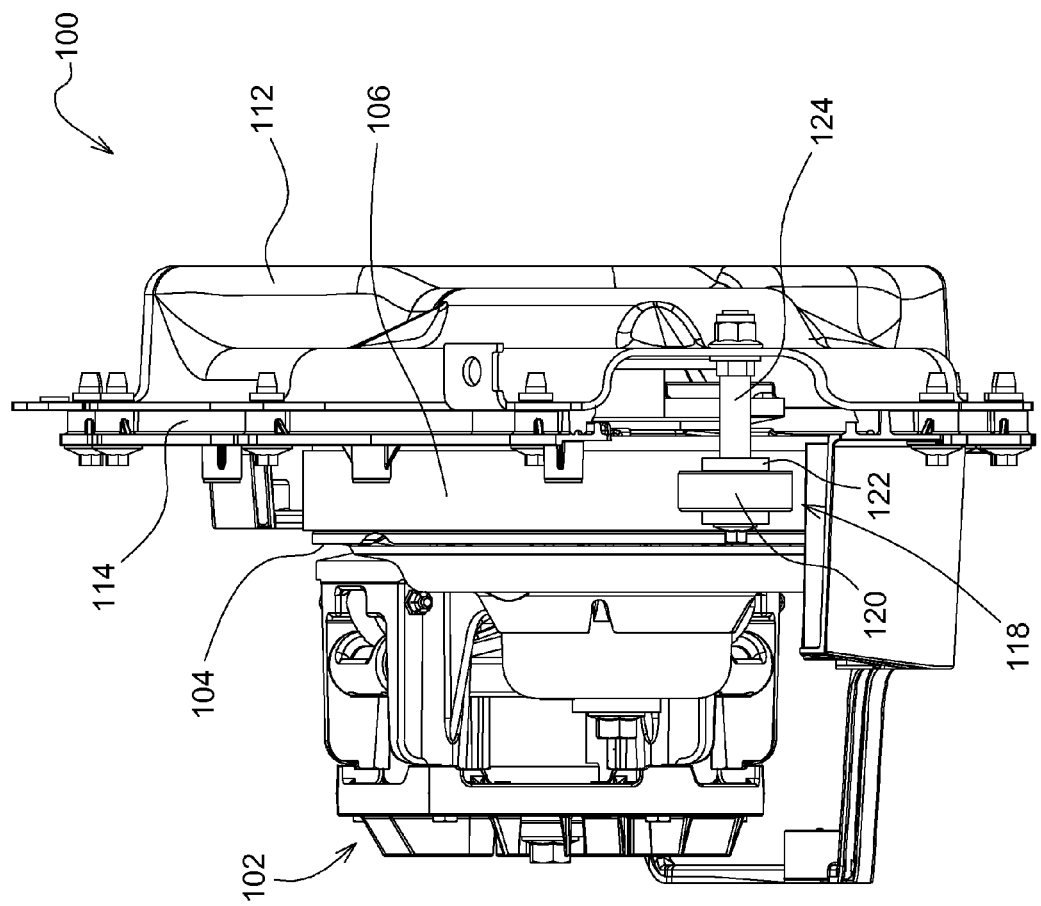
FIG. 2 is an end view of a continuously variable transmission with a belt guide according to a first embodiment of the invention.

FIGS. 1-2 show continuously variable transmission (CVT) 100 on a recreational or off-road utility vehicle. The CVT may include drive clutch assembly 102, also referred to as a primary clutch, and driven clutch assembly 104, also referred to as a secondary clutch. Each of the drive and driven clutch assemblies include a pulley that is split perpendicular to the axis of rotation. The CVT may be changed to any drive ratio between a lowest drive ratio and a highest drive ratio by moving the two sheaves of one pulley closer together and the two sheaves of the other pulley farther apart. CVT belt 106 may be a "loose" belt that is not pre-tensioned between the drive and driven clutches. The CVT belt also may be referred to as a V-belt because it has a V-shaped cross section so that it may ride higher on one pulley and lower on the other when it is around the drive and driven clutch assemblies.

In one embodiment, the drive and driven clutch assemblies of the CVT may be enclosed and supported by outer cover 110, back plate 112 and intermediate cover 114. The outer cover, back plate and intermediate cover may be secured together by threaded fasteners or clips to form a CVT housing. Air intake tube 116 may be connected to the CVT housing for providing cooling air to the CVT belt and clutches. Drive clutch assembly 102 also may include fins that rotate with the drive clutch assembly to draw air in through the air intake tube to the CVT housing.

In one embodiment, CVT belt guide 118 may be positioned inside the CVT housing next to the driven clutch assembly. The CVT belt guide may include bearing 120 which may contact the CVT belt at the CVT's lowest drive ratio. The bearing may be any circular, cylindrical or roller shaped part, or bushing, that bears friction and is rotatable on an axis parallel to the drive and driven clutches. The bearing is positioned in close proximity with the CVT belt, and may rotate if contacted by the CVT belt. For example, the bearing's outer surface may be located between about 0 mm and about 2 mm from the V-belt when the V-belt is at the outer or maximum circumference of the driven clutch assembly. When the CVT belt guide contacts and rotates with the CVT belt, the CVT belt guide prevents any ripples or waves in the slack portion of the belt from losing contact with the driven clutch assembly at low drive ratios.

In one embodiment, CVT belt guide 118 may include one or more bushings 122 on a first end of guide post 124. The bushings may provide shoulders on each side of bearing 120 to locate the bearing in a rotatable position aligned with the V-belt on the driven clutch. Guide post 124 may include a base that is mounted and secured to the CVT housing, and specifically to back plate 112.

Having described the preferred embodiment, it will become apparent that various modifications can be made without departing from the scope of the invention as defined in the accompanying claims.

The invention claimed is:
1. An apparatus, comprising:
   a continuously variable transmission having a drive clutch assembly, a driven clutch assembly, and a CVT belt connecting between a pair of moveable sheaves of each clutch assembly to provide a variable CVT drive ratio between a lowest drive ratio and a highest drive ratio; and
   a rotatable belt guide mounted on a post attached at a fixed position next to a maximum circumference of the driven clutch assembly where the guide contacts the CVT belt at the CVT's lowest drive ratio.

2. The apparatus of claim 1, wherein the belt guide outer surface is within 2 mm of the CVT belt at the CVT's lowest drive ratio.

3. An apparatus, comprising:
a belt guide mounted to a post secured to a continuously variable transmission housing enclosing a drive clutch assembly, a driven clutch assembly, and a V-belt between the drive clutch assembly and the driven clutch assembly;
the belt guide including a rotatable bearing that can contact the V-belt where the belt guide is mounted at a maximum circumference of the driven clutch assembly.

4. The apparatus of claim 3, wherein the rotatable bearing is positioned between a pair of bushings.

5. An apparatus, comprising:
a rotatable bearing supported by a guide post that is mounted and secured at a fixed position adjacent a driven clutch assembly of a continuously variable transmission to contact and rotate with a CVT belt at an outer diameter of the driven clutch assembly if the CVT belt begins to lose contact with the driven clutch assembly while at a lowest drive ratio of the continuously variable transmission.

6. The apparatus of claim 5, wherein the CVT belt is a V-belt.

7. The apparatus of claim 5, wherein the lowest drive ratio is at a maximum circumference of the driven clutch assembly.

* * * * *